Dec. 3, 1935.  L. J. VETRANO  2,023,060

COUPLING

Filed Feb. 9, 1933

Inventor

Leon J. Vetrano

By Hardway Cathey
Attorneys

Patented Dec. 3, 1935

2,023,060

UNITED STATES PATENT OFFICE 2,023,060

COUPLING

Leon J. Vetrano, Houston, Tex.

Application February 9, 1933, Serial No. 655,886

2 Claims. (Cl. 285—129)

This invention relates to a coupling.

An object of the invention is to provide two coupling members of novel design, with novel means for securing said coupling members together whereby adjacent sections of pipe may be connected together into a line.

Another object of the invention is to provide a novel type of coupling whereby the united sections of pipe may be readily separated.

A still further object of the invention is to provide, in a device of the character described, a sectional, expansible wedge ring or nut adapted to be connected to one part in combination with a clamp ring shaped to be driven on said wedge ring to clamp the same in active position.

With the above and other objects in view, the invention has particular relation to certain novel features of construction, arrangement of parts and use, an example of which is given in this specification and illustrated in the accompanying drawing, wherein:—

Figure 1:
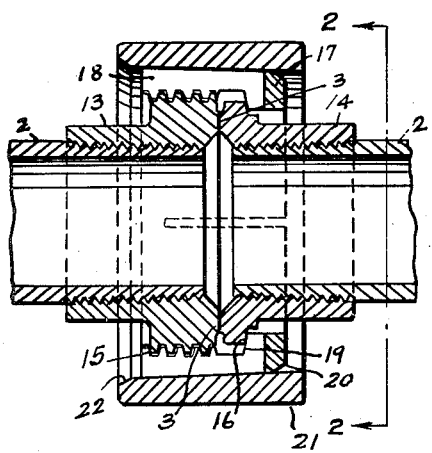
Figure 1 shows a longitudinal sectional view of the coupling.
Figure 2:
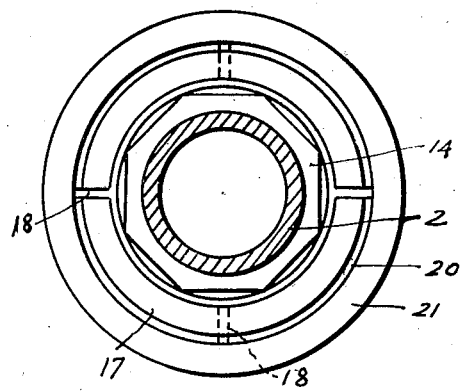
Figure 2 shows an end view thereof as presented along the line 2—2 of Figure 1.

In the form shown, the coupling members 13, 14 may be threaded onto the pipe sections 2, 2 and the adjacent ends of these coupling members may be provided with the abutting faces 3, 3 which fit closely together to form a fluid tight joint as in the form shown in Figure 1. These abutting ends are externally enlarged and the enlarged portion of the coupling member 13 is provided with the external coarse threads 15 and the enlarged end of the coupling member 14 is provided with the annular sloping face 16. There is an expansible wedge 17 which is slotted at opposite ends, forming the slots 18 arranged in staggered relation so that said wedge ring will be expansible. This wedge ring is fitted over the coupling member 14 and is threaded onto the coupling member 13 and has an annular shoulder provided with a sloping face 19 which engages the corresponding sloping face 16 when the wedge ring is screwed home. The wedge ring 17 is externally tapered and at its smaller end is chamfered as at 20. There is an annular clamp ring 21 having an inside taper to correspond to the outside taper of the wedge ring 17 and of an inside diameter to closely surround said wedge ring when driven thereon. This clamp ring 21 at its larger end is chamfered as at 22, said chamfered faces 20, 22, being provided so that the clamp ring 21 may be easily started on the wedge ring 17 when it is desired to drive the same thereon.

In assembly the coupling members 13, 14, may be secured to adjacent ends of sections of pipe to be coupled together and the faces 3 brought into abutting relation. The wedge ring 17 may then be fitted over the coupling member 14 and screwed loosely on to the coupling member 13 until the face 19 abuts the sloping face 16 and the faces 3, 3 are drawn together. The clamp ring 21 may then be driven onto the wedge ring 17 and said wedge contracted, and the contacting sloping faces of the threads and the faces 16 and 19 will be effective to draw said faces tightly together, and the clamp ring will maintain the parts assembled.

The coupling may be readily broken by driving off the clamp ring in an obvious manner.

The drawing and description disclose what are now considered to be preferred forms of the invention by way of illustration only, while the broad principle of the invention will be defined by the appended claims.

What I claim is:

1. A coupling comprising two coupling members having smooth, annular, end faces shaped to fit closely together, the abutting ends of said coupling members being externally enlarged, one of said enlarged ends being provided with external, coarse, threads and the other enlarged end being provided with an annular tapering face, an expansible, one-piece wedge ring having internal threads at one end which mesh with the threads on one coupling member and the other end of said ring having a larger inside diameter than the outside diameter of the corresponding coupling member having an inside tapering face which engages the tapering face of the other coupling member when said wedge ring is screwed home, said wedge ring having a tapering exterior and an annular clamp ring having an inside taper to correspond to the outside taper of the wedge ring, said clamp ring being driven onto the wedge ring whereby said threads and said coacting tapering faces will be rendered effective to draw the coupling members together.

2. A coupling comprising two coupling members, the adjacent ends of said coupling members being externally enlarged, one of said enlarged ends being provided with external threads and the other enlarged end being provided with an annular tapering face, an expansible one piece ring having internal threads at one end which mesh with the threads of one coupling member and whose other end is spaced from the other coupling member all the way around, said other end having an inside tapering face which engages the tapering face of said other coupling member when said ring is screwed home and means for contracting said ring whereby said threads and said coacting tapering faces will be rendered effective to draw the coupling members together.

LEON J. VETRANO.